United States Patent
Kim (10) Patent No.: US 9,864,073 B1
(45) Date of Patent: Jan. 9, 2018

(54) SYSTEMS AND METHODS FOR CONTROLLING OPTICAL COUPLING BETWEEN SCINTILLATOR CRYSTALS

(71) Applicant: General Electric Company, Schenectady, NY (US)

(72) Inventor: Chang Lyong Kim, Brookfield, WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/252,423

(22) Filed: Aug. 31, 2016

(51) Int. Cl.
   *G01T 1/20* (2006.01)
   *G01T 1/202* (2006.01)
   *G01T 1/29* (2006.01)

(52) U.S. Cl.
   CPC ............ *G01T 1/202* (2013.01); *G01T 1/2985* (2013.01)

(58) Field of Classification Search
   CPC .............................. G01T 1/202; G01T 1/2985
   USPC ....................................................... 250/361 R
   See application file for complete search history.

(56) References Cited

U.S. PATENT DOCUMENTS

| 5,227,633 | A | 7/1993 | Ryuo et al. |
| 5,319,204 | A | 6/1994 | Wong |
| 5,866,908 | A | 2/1999 | Novak |
| 6,717,150 | B2 * | 4/2004 | Hoffman ............... G01T 1/2985 250/367 |
| 8,718,226 | B2 | 5/2014 | Jorritsma et al. |
| 9,182,506 | B2 | 11/2015 | Kim et al. |
| 2010/0270463 | A1 | 10/2010 | Lee et al. |
| 2011/0042571 | A1 | 2/2011 | Perna |
| 2013/0299707 | A1 * | 11/2013 | Levin ..................... G01T 1/164 250/363.03 |
| 2015/0219771 | A1 | 8/2015 | Kim et al. |
| 2016/0170040 | A1 | 6/2016 | Kim |

FOREIGN PATENT DOCUMENTS

| WO | 2003081280 A2 | 10/2003 |
| WO | 2014181232 A1 | 11/2014 |

OTHER PUBLICATIONS

International Search Report and Written Opinion for corresponding PCT application No. PCT/US2017/047766 dated Oct. 19, 2017; 12 pages.

* cited by examiner

*Primary Examiner* — David Porta
*Assistant Examiner* — Meenakshi Sahu
(74) *Attorney, Agent, or Firm* — Dean D. Small; The Small Patent Law Group, LLC (57) ABSTRACT

A scintillator crystal array includes crystals and a clear film adhesive (CFA) layer. The crystals are configured to receive rays emitted by an object to be imaged and to emit light photons responsive to the rays. The crystals include a first crystal and a second crystal that are spaced apart from one another by a gap. The CFA layer is disposed in the gap between the first and second crystals. The CFA layer is configured to at least partially optically couple the first and second crystals.

20 Claims, 7 Drawing Sheets

SYSTEMS AND METHODS FOR CONTROLLING OPTICAL COUPLING BETWEEN SCINTILLATOR CRYSTALS

BACKGROUND OF THE INVENTION

The subject matter disclosed herein relates generally to imaging systems and techniques, and more particularly to crystal arrays used in scintillators.

In certain types of imaging devices, such as positron emission tomography (PET) scanners, arrays of detector elements are used to detect radiation emanating from the patient. In a PET scanner, for example, arrays of scintillator crystals may be used to detect annihilation rays which are generated inside the patient. The annihilation rays are produced when a positron emitted from a radiopharmaceutical injected into the patient collides with an electron causing an annihilation event. The scintillator crystals receive the annihilation rays and generate light photons in response to the annihilation rays. The light photons are emitted from the scintillator crystals to a photosensor configured to convert the light energy from the light photons to electrical energy used to reconstruct an image.

Timing resolution of a time of flight (TOF) PET detector may depend on a number of components, including scintillation crystals and photosensors, and how the scintillation crystals and photosensors are combined into a detector along with readout electronics. Factors relating to the combination of the scintillation crystals and photosensors that may affect timing resolution include, for example, the light sharing scheme among the crystals and photosensors, the layout of photosensors, transit time spread between the photosensors, signal trace layout on amplifier board, and electronics noise.

Because of the high speeds of annihilation rays (e.g., the speed of light) and relatively short distances traveled by the annihilation rays during imaging, the timing resolution of detectors is important to imaging, especially considering the trending demands for higher image quality with improved timing resolution.

BRIEF DESCRIPTION OF THE INVENTION

In accordance with various embodiments, a scintillator crystal array is provided that includes crystals and a clear film adhesive (CFA) layer. The crystals are configured to receive rays emitted by an object to be imaged and to emit light photons responsive to the rays. The crystals include at least a first crystal and a second crystal that are spaced apart from one another by a gap. The first and second crystals include respective inner side walls that extend along the gap and face one another. The CFA layer is disposed in the gap between the first and second crystals. The CFA layer is configured to fully or partially optically couple the first and second crystals.

In accordance with various embodiments, a detector system is provided that includes a scintillator crystal array and a photosensor. The scintillator crystal array extends between a reception end and an emission end. The scintillator crystal array includes crystals extending between the reception end and the emission end. The crystals are configured to receive rays emitted by an object to be imaged at the reception end and to emit light photons responsive to the rays. The crystals include at least a first crystal and a second crystal that are spaced apart from one another by a gap. The first and second crystals include respective inner side walls that extend along the gap and face one another. The scintillator crystal array further includes a clear film adhesive (CFA) layer disposed in the gap between the first and second crystals. The CFA layer is configured to at least partially optically couple the first and second crystals. The CFA layer comprises at least one non-coupling (NC) region. The NC region is configured to provide local decoupling to at least partially optically separate the first and second crystals. The photosensor is configured to receive light photons emitted from the emission end of the scintillator crystal array. The first and second crystals have respective lower surfaces at the emission end that face and optically couple to the photosensor.

In accordance with various embodiments, a method for providing a scintillator crystal array for imaging an object is provided. The method includes arranging crystals in an array. The crystals are configured to receive rays emitted by an object to be imaged and to emit light photons responsive to the rays. The crystals include at least a first crystal and a second crystal. The method also includes positioning the first crystal relative to the second crystal to space apart the first and second crystals from one another by a gap. The first and second crystals include respective inner side walls that extend along the gap and face one another. The method further includes disposing a clear film adhesive (CFA) layer in the gap between the first and second crystals. The CFA layer is configured to at least partially optically couple the first and second crystals.

DETAILED DESCRIPTION OF THE INVENTION

The following detailed description of certain embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, hard disk, or the like) or multiple pieces of hardware. Similarly, the programs may be stand-alone programs, may be incorporated as subroutines in an operating system, may be functions in an installed software package, and the like. It should be understood that the various embodiments are not limited to the arrangements and instrumentality shown in the drawings.

As used herein, the terms "system" and "unit" include a hardware and/or software system that operates to perform one or more functions. For example, a system or unit may include electronic circuitry that includes and/or is coupled to one or more computer processors, controllers, or other logic based devices that perform operations based on instructions stored on a tangible and non-transitory computer readable storage medium, such as a computer memory. Alternatively or additionally, a system or unit may include a hard-wired device that performs operations based on hard-wired logic of the device. The systems or units shown in the attached figures may represent the hardware that operates based on software or hardwired instructions, the software that directs hardware to perform the operations, or a combination thereof. "Systems" or "units" may include or represent hardware and associated instructions (e.g., software stored on a tangible and non-transitory computer readable storage medium, such as a computer hard drive, ROM, RAM, or the like) that perform one or more operations described herein. The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described herein. Additionally or alternatively, one or more of these devices may be hard-wired with logic circuits to perform these operations. Further, "systems" or "units" may be configured to execute one or more algorithms to perform functions or operations described herein. The one or more algorithms may include aspects of embodiments disclosed herein, whether or not expressly identified in a flowchart or as a step of a method.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Also as used herein, the phrase "image" or similar terminology is not intended to exclude embodiments in which data representing an image is generated, but a viewable image is not. Therefore, as used herein the term "image" broadly refers to both viewable images and data representing a viewable image. However, certain embodiments generate, or are configured to generate, at least one viewable image.

Various embodiments provide scintillator crystal arrays for detectors systems, where a clear film adhesive (CFA) is disposed in at least one interstitial gap defined between adjacent crystals in the array. For example, the CFA layer is configured to fully or partially optically couple the adjacent crystals on either side of the CFA layer, such that at least some light rays, or photons, emitted into the interstitial gap from an inner side of a first crystal are transmitted through the CFA layer and received into a second crystal through an inner side thereof. The CFA layer is designed to control an amount of optical coupling between the two crystals across the interstitial gap. For example, the CFA layer is configured to provide a selected amount or range of optical coupling to allow the detector system to achieve a higher spatial resolution detector with smaller crystals (e.g., accuracy, resolution, of the like). The CFA layer may be fully or partially composed of a CFA film that has a relatively high transparency. In order to control the optical coupling between crystals, the CFA layer has a different refractive index than the crystals and/or includes one or more non-coupling (NC) regions.

For example, optical coupling can be described by a level of light transmission between two materials. Light transmission can be characterized as $T=1-R$, where T is the light transmission and R is the reflectance. The reflectance for normal incidence is $R=((n1-n2)/(n1+n2))^2$ as defined by the Fresnel equation, where n1 and n2 are refractive indices of the two materials. Therefore, the transmission for normal incidence is $T=1-((n1-n2)/(n1+n2))^2$. For example, when a light photon incidents from a Bismuth Germanate (BGO) crystal of refractive index 2.3 (e.g., n1=2.3) to an air gap of refractive index 1.0 (e.g., n2=1.0), the transmission is 84%. However, when a light photon incidents from the BGO crystal to a clear adhesive layer of refractive index n2=1.47, the transmission is higher at 95%. Therefore, a clear adhesive layer between two adjacent crystals provides better optical coupling than an air gap between the crystals. Since the Fresnel equation only describes light that incidents at a normal angle and light photons in reality incident in various angles, the total observed light transmission would be lower than the percentages shown in the example above. The example above shows that the material between two crystals controls the amount of optical coupling between the crystals.

In one or more embodiments, it may be desirable to have a level of optical coupling between adjacent crystals that is greater than a level of optical coupling provided by an air gap (e.g., with a normal incidence transmission of 84%), but less than a level of optical coupling provided by filling the entire gap with a clear film adhesive (e.g., with a normal incidence transmission of 95%). In one or more embodiments, the CFA layer may be provided with one or more non-coupling (NC) regions along the clear film adhesive. The NC regions are configured to reduce local coupling (e.g., provide local uncoupling) between the crystals to achieve the effect of the CFA layer providing an overall reduced level of optical coupling. For example, the NC regions achieve the effect of the CFA layer having a lower refractive index material than if the CFA layer consisted entirely of the clear film adhesive. Lowering the refractive index of the CFA layer increases the difference in refractive indices between the CFA layer and the crystals (e.g., at a refractive index of 2.3), which reduces the level of light transmission across the crystals through the CFA layer. Since CFA layers having less than 1.4 refractive index are generally not available (typically between 1.45 and 1.5), the CFA layer with the NC regions provides an overall level of optical coupling that is greater than a level of optical coupling provided by an air gap alone between the crystals. The number, size, location, and composition of the NC regions may be controlled to achieve the selected amount or range of optical coupling between the adjacent crystals in the array that is provided by the CFA layer.

One or more embodiments described herein utilize a solid state clear adhesive film layer to control a spread of light between crystals in a scintillator crystal array. The use of a solid state clear adhesive film may be preferable over utilizing liquid adhesive glue because of reduced manufacturing and/or part costs and increased control over an amount of light spreading between the crystals. For example, the CFA layer is flexible and compressible, but also in a solid state which allows the CFA layer to be cut to a proper size or shape for application to only an area of the crystals that is desired. By contrast, liquid glue is hard to control due to the low viscosity and often flows to undesired areas of the crystals. The use of the liquid glue often requires a separate cleaning step to remove the glue from undesired areas of the crystals and/or the tools used for assembling the scintillator crystal array. The additional cleaning step requires additional time and cost. Due to the low viscosity of liquid glue, it is difficult to achieve a designated amount of partial coverage of a crystal surface and is also difficult (if not impossible) to repeatably provide a consistent amount of coverage for mass production of the crystal arrays. However, the solid state CFA layer can be accurately and repeatedly cut into specific sizes and shapes and accurately applied to the crystals, without messy runoff of the adhesive. Air gaps may be formed in the CFA layer and/or reflective inserts may be embedded in the CFA layer to control an amount of light spread across the crystals. The use of the solid state CFA layer to control light spread may enable an increased number of crystals in a photosensor array relative to known detector systems, which can increase the spatial resolution.

Figure 1:
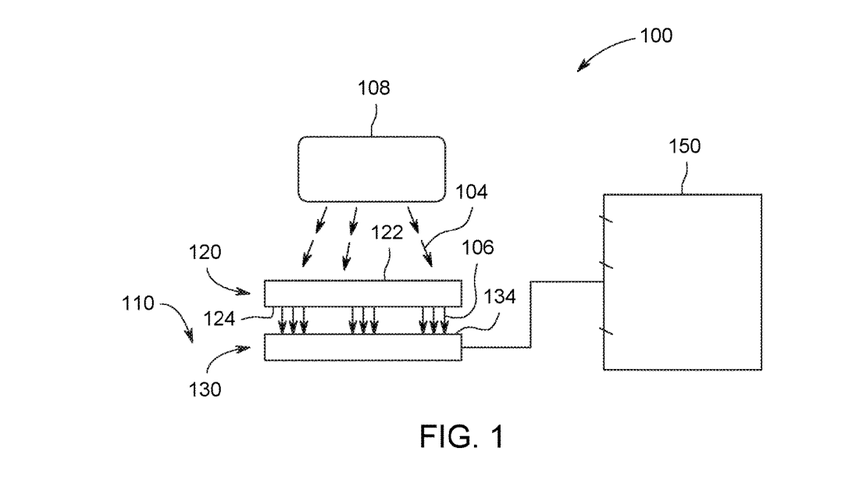
FIG. 1 is a schematic diagram of an imaging system in accordance with various embodiments.

FIG. 1 is a schematic diagram of an imaging system 100 in accordance with various embodiments. The imaging system 100 includes a detector system 110 and a processing unit 150. The detector system 110 includes a scintillator crystal array 120 and a photosensor 130. In the illustrated embodiment, the scintillator crystal array 120 and the photosensor 130 form a positron emission tomography (PET) detector. However, in other embodiments, the scintillator crystal array 120 and the photosensor 130 may additionally or alternatively be used with one or more other imaging modalities, such as single-photon emission computed tomography (SPECT), for example. It may be noted that one or more the various components or units of FIG. 1, although depicted as physically separate units or components, may in various embodiments be configured as more than one component or unit and/or be combined with another component or unit. For example, the photosensor 130 and one or more aspects of the processing unit 150 may be configured as a single unit.

Generally, in the illustrated embodiment, the imaging system 100 may be used to provide an image (e.g., a PET image) of the object 108. The object 108, for example, may be a portion of a human or animal patient. In the illustrated embodiment, the object 108 emits annihilation rays 104 due to the introduction of a radiopharmaceutical. The annihilation rays 104 are sensed by the detector 110 and used to reconstruct an image. The emitted rays may be gamma rays or other electromagnetic radiation produced by a transition in the nucleus of an atom.

The depicted scintillator crystal array 120 produces light photons 106 responsive to the impact of annihilation rays 104 upon the scintillator crystal array 120. The light photons 106 from the scintillator crystal array 120 impact the photosensor 130. The photosensor 130 is configured to produce electric charge responsive to the impingement of light photons 106 from the scintillator upon a light reception surface 134 of the photosensor 130. The electric charge generated responsive to the reception of light may be measured by the processing unit 150 and used to determine the amount of light impinging upon a given portion of the photosensor 130, such as one or more pixels. The amount of light impinging upon various portions of the photosensor 130 may be used to identify the location where the annihilation ray interacted in the scintillator crystal array 120. Furthermore, the total amount of light impacting the photosensor 130 may be used to determine the energy of the annihilation ray.

It may be noted that a large number of light photons may be produced for each annihilation ray 104 that impacts the scintillator crystal array 120. It may also be noted that in the schematic depiction of FIG. 1 the scintillator crystal array 120 is shown at a distance from the photosensor 130; however, the scintillator crystal array 120 and photosensor 130 may be joined in various embodiments. Furthermore, in some embodiments, a light guide (not shown) may be provided between the scintillator crystal array 120 and the photosensor 130. The light guide may be a transparent interface that is used, for example when the surface area of the scintillator crystal array 120 facing the photosensor 130 is not the same as the surface area of the photosensor 130 facing the crystal array 120.

The scintillator crystal array 120 includes a reception end 122 and an emission end 124. The reception end 122 is oriented toward the object 108, and the emission end 124 is oriented toward the photosensor 130. Generally, in various embodiments, an annihilation ray impacts the reception end 122 and produces a relatively large number of light photons that enter the scintillator crystal array 120. A portion of the light photons 106 propagate through the crystal array 120 and are emitted from the emission end 124 towards the photosensor 130. It may be noted, as also discussed below, that the emission end and reception end of the scintillator crystal array 120 may be oriented in different directions in various alternate embodiments (e.g., the reception end, oriented upwards towards the object being image, may be oriented orthogonally relative to the emission end in one embodiment).

The photosensor 130 is configured to receive the light photons 106 from the scintillator crystal array 120 and convert received light photons 106 to a corresponding electric charge. The light photons 106 may be converted and collected by specific portions (e.g., pixels) of the photosensor 130 that receive the energy, and the collected charge may be used to provide a measure of the light photons 106 received by the photosensor 130 on a per pixel basis.

Figure 2:
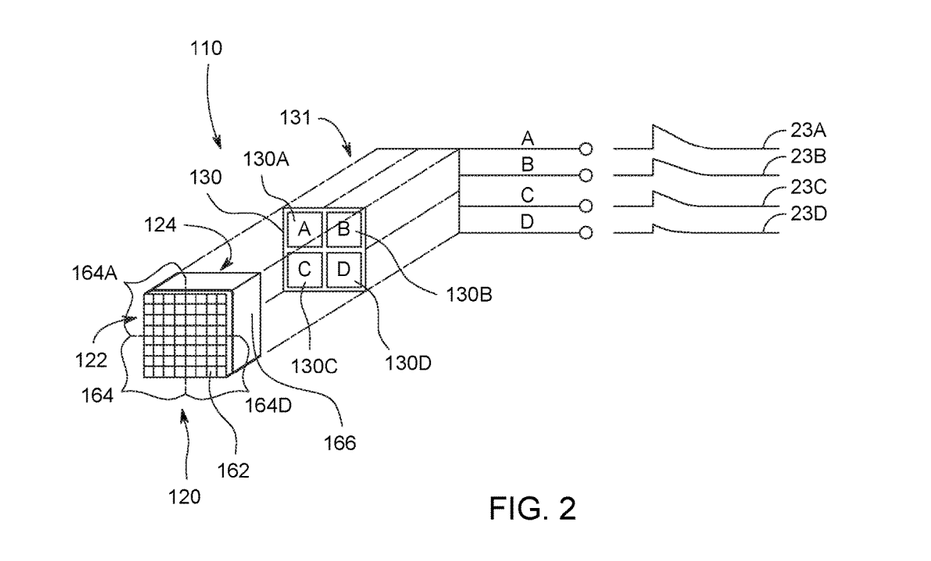
FIG. 2 is a schematic diagram showing an exploded detector system of the imaging system according to an embodiment.

FIG. 2 is a schematic diagram showing an exploded detector system 110 according to an embodiment. The scintillator crystal array 120 includes individual crystals 162. The crystals 162 extend between the reception end 122 and the emission end 124 of the scintillator crystal array 120. The crystals 162 may be composed of, for example, Lutetium Yttrium Silicate (LYSO), Bismuth Germanate (BGO), or the like. The illustrated array 120 includes sixty-four crystals 162 arranged in eight rows and eight columns, but the array 120 may include other numbers of crystals 162 and/or other arrangements or configurations of the crystals 162 in other embodiments.

In the illustrated embodiment, the detector system 110 includes four photosensors 130 that face the emission end 124 of the scintillator crystal array 120. The photosensors 130 are depicted schematically as photomultiplier tubes, although Silicon photomultipliers (SiPM) may be employed in other embodiments. The four photosensors 130 are arranged in a 2×2 array and comprise a photosensor array 131. Each photosensor 130 is aligned with a different subset 164 of the crystals 162 in the array scintillator crystal 120. Each subset 164 of crystals 162 includes multiple crystals 162. For example, since there are four photosensors 130 in the illustrated embodiment, the subsets 164 are quadrants of the array 120. For example, the photosensor 130D aligns with the quadrant 164 in the lower right region of the array 120. Each photosensor 130 is optically coupled to the crystals 162 of the corresponding subset 164 associated with the photosensor 130. The light photons projecting from the emission end 124 of the crystal array 120 are received by the corresponding photosensors 130 that aligns with the crystals 162 emitting the light photons. For example, the photosensor 130D is configured to receive the light photons emitted from the crystals 162 in the lower right subset 164D that project from the emission end 124. In the illustrated embodiment, the subsets 164 each include sixteen crystals 162, but the photosensors 130 may be associated with other numbers of crystals 162 in other embodiments. For example, in one or more embodiments, each subset 164 includes at least four crystals 162, such that at least four crystals 162 are optically coupled to each of the photosensors 130. It should be noted that the use of the terms "upper," "lower," "left," "right," "top," and "bottom" herein are used to distinguish the referenced elements and do not necessarily require particular positions or orientations relative to the surrounding environment of the imaging system 100 (shown in FIG. 1) or the detector system 110. For example, the array 120 may be rotated such that the lower right subset 164D is disposed along a left side and/or an upper side of the array 120.

During a PET scan, an annihilation ray may impinge upon one of the crystals 162 at the reception end 122 of the scintillator crystal array 120. The crystal 162 that receives the annihilation ray is configured to scintillate, or produce a number of light photons, in response to the impinging ray, which is called a scintillation event. The light photons generated by the crystal 162 generally spread out to a certain extent and travel into adjacent crystals 162, referred to herein as light spreading. Therefore, multiple crystals 162 emit light photons from the emission end 124 towards the photosensors 130 responsive to a scintillation event. For example, at least some of the light photons generated by a crystal 162 in the subset 164D may spread into crystals 162 in at least some of the other subsets 164 in the array 120. Therefore, due to the light spreading, multiple photosensors 130 receive light photons as a result of the annihilation ray impacting a single crystal 162 associated with only one photosensor 130. The number and/or energy of the light photons received by each of the photosensors 130 may vary depending on proximity of the photosensors 130 to the crystal 162 that receives the annihilation ray. The detector system 110 is configured to use information regarding the light photons received by the multiple photosensors 130 to, among other things, determine which crystal 162 in the array 120 received the annihilation ray. As described in more detail herein, accurately determining which crystal 162 received the annihilation ray is used by the imaging system 100 (shown in FIG. 1) to generate an accurate and/or high resolution image of the object 108 (FIG. 1) being imaged.

In response to a scintillation event, each photosensor 130 produces an electrical signal 23A-23D on one of the lines A-D. The signals 23A-23D may represent currents, voltages, frequencies, or the like. The signals 23A-23D rise sharply when a scintillation event occurs and then tails off exponentially. The relative magnitudes of the signals 23A-23D are determined by the position in the scintillator crystal array 120 at which the scintillation event took place. In the illustrated embodiment, the signal 23A generated by the photosensor 130A has a greater magnitude than the signals 23B-23D generated by the other photosensors 130B-130D, which indicates that the annihilation ray impinged upon one of the crystals 162 in the subset 164A associated with the photosensor 130A. The determination of which of the crystal 162 in the subset 164A actually received the annihilation ray may be made by analyzing all four of the signals 23A-23D (e.g., using the processing unit 150 shown in FIG. 1). The relative size of those four signals depends on the light spread/sharing schemes detailed below. The energy of the annihilation ray which caused the scintillation event determines the total sum of the four signals 23A-23D. The time that the signal begins to rise is determined by when the scintillation event occurs and the time required for light photons to travel from the position of the scintillation event to the photosensors.

Optionally, the scintillator crystal array 120 includes a reflector member 166. The reflector member 166 extends around the sides of the array 120 between the reception end 122 and the emission end 124. The reflector member 166 does not extend along the reception end 122 or the emission end 124. The reflector member 166 is configured to reflect light generated by the crystals 162 directed from the sides of the array 120 back into the array 120. Thus, the light generated from the array 120 may be prevented from escaping from the sides of the array 120, increasing the proportion of the light created by the scintillation event that is emitted from the emission end 124 toward the photosensors 130.

In the illustrated embodiment, the photosensor array 131 that is optically coupled to the scintillator crystal array 120 consists of four photosensors 130, but other numbers of photosensors 130 may be optically coupled to the scintillator crystal array 120 in other embodiments. Furthermore, the detector system 110 may include multiple scintillator crystal arrays 120 and multiple photosensor arrays 131 arranged side-by-side to form a panel or in order to increase the surface area of the detector system 110. For example, the reflector member 166 on the illustrated scintillator crystal array 120 may be used to prevent or at least prohibit light photons generated by another crystal array in the panel from being received by the crystals 162 in the scintillator crystal array 120.

Returning to FIG. 1, the depicted processing unit 150 is configured to receive information (e.g., the signals 23A-23D) from the multiple photosensor arrays 131 (and photosensors 130 thereof), and to use the information to reconstruct an image. For example, the processing unit 150 may be configured to use the signal recorded for each pixel of the photosensors 130 to reconstruct an image. Generally, in various embodiments, the processing unit 150 (and/or any sub-unit thereof) may be understood as a processing circuitry unit and may include a memory as well as processing circuitry such as one or more field programmable gate array (FPGA), application specific integrated circuit (ASIC), integrated circuit (IC), or microprocessor. In the illustrated embodiment, the processing unit 150 is configured to read and record the signal measured in each pixel of the photosensors 130 following an exposure to light provided by the scintillator crystal array 120. For example, each pixel may be configured to provide an output voltage representative of the amount of energy impacting that particular pixel. The recorded signals for each pixel may be used to reconstruct one or more images.

Figure 3:
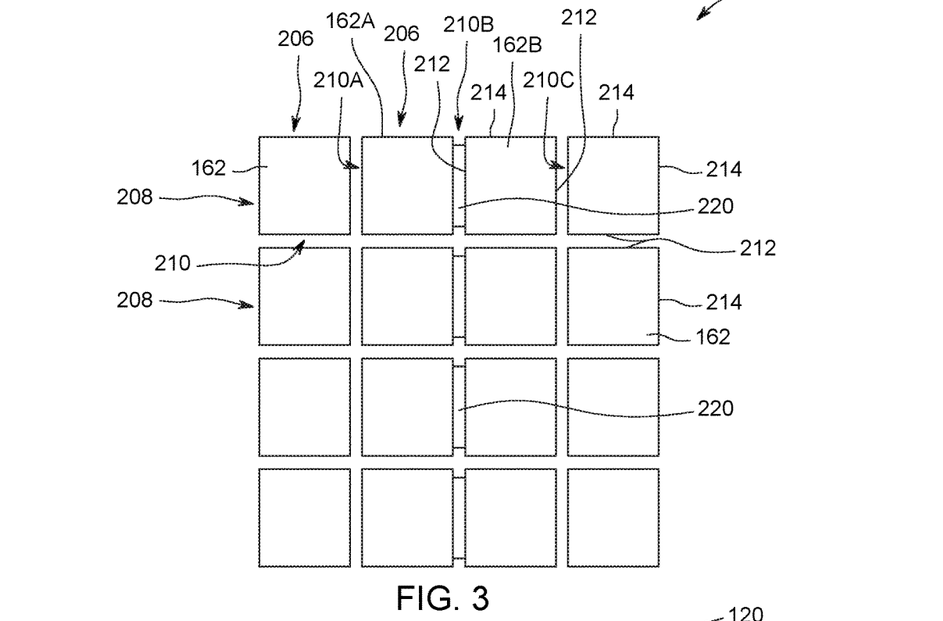
FIG. 3 is an end view of a scintillator crystal array of the detector system according to an embodiment.

FIG. 3 is an end view of the scintillator crystal array 120 according to an embodiment. The scintillator crystal array 120 shown in FIG. 3 depicts a portion of the array 120 shown in FIG. 2, such as one of the subsets 164 of the array 120. The end view shows the reception end 122 (FIG. 2) of the scintillator crystal array 120 or the emission end 124 (FIG. 2) of the crystal array 120. The crystals 162 in the array 120 are arranged in columns 206 and rows 208.

Although equal numbers of columns 206 and rows 208 (e.g., four each) are shown in the illustrated embodiment, in other embodiments the array 120 may include a different number of columns 206 than rows 208. Furthermore, the number of crystals 162 in each column 206 and row 208 may vary in other embodiments. The crystals 162 are spaced apart from one another by interstitial gaps 210. The interstitial gaps 210 extend between adjacent columns 206 and between adjacent rows 208. The interstitial gaps 210 affect an extent to which optical coupling occurs between adjacent crystals 162. For example, the gaps 210 may be at least partially filled with a solid material or gas, such as a CFA layer, air, and/or a reflective insert, that controls the transmission of light photons across the gaps 210 between crystals 162.

The crystals 162 include inner side walls 212 and outer side walls 214 extending a length of the crystals 162 (e.g., between the reception end 122 and the emission end 124 shown in FIG. 2). The inner side walls 212 extend along the interstitial gaps 210 and face adjacent crystals 162. The outer side walls 214 face outward from the array 120. For example, an outer perimeter of the array 120 is defined by outer side walls 214 of the crystals 162 located along outer edges of the array 120. In an example, an interstitial gap 210 extends between a first crystal 162A in the array 120 and an adjacent second crystal 162B in the array 120. The two adjacent crystals 162A, 162B in the illustrated embodiment are disposed in the same row 208, but alternatively may be located in the same column 206. The interstitial gap 210 extends between an inner side wall 212 of the first crystal 162A and an inner side wall 212 of the second crystal 162B. The two inner side walls 212 of the crystals 162A, 162B face each other across the gap 210.

Figure 4:
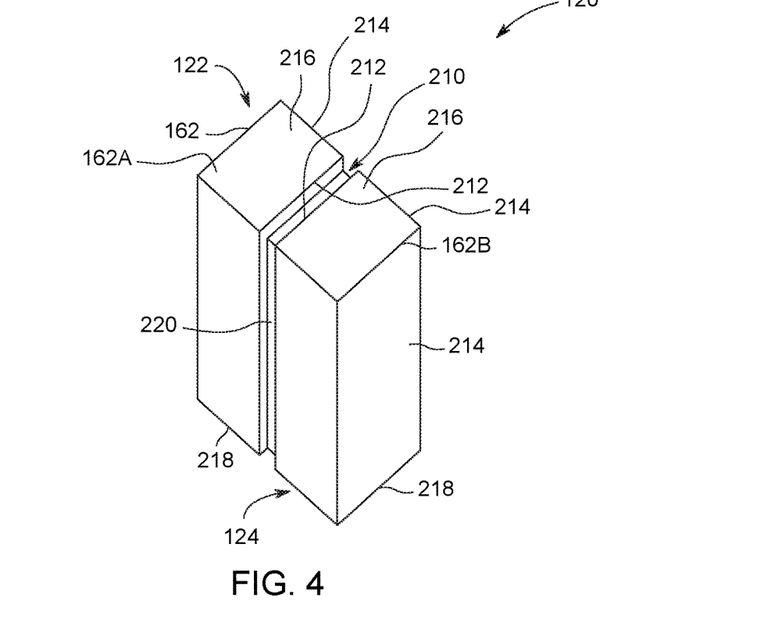
FIG. 4 is a perspective view of a portion of the scintillator crystal array including two adjacent crystals according to an embodiment.

FIG. 4 is a perspective view of a portion of the scintillator crystal array 120 showing an interface region between two adjacent crystals 162 according to an embodiment. The two crystals 162 may be identical or at least substantially similar to one another in shape, size, and/or composition. The crystals 162 include an upper surface 216 and a lower surface 218. The upper surface 216 and the lower surface 218 are disposed opposite of each other and are separated by side walls, including the inner and outer side walls 212, 214. The side walls define a height of the crystal 162, which may be between 10 and 50 mm in various embodiments, such as 30 mm. The upper surfaces 216 and the lower surfaces 218 have a length and a width. In an embodiment, the length and width are each between 2 and 8 mm, such as between 4 and 6 mm. The crystals 162 have generally rectangular cross-sections.

In the illustrated embodiment, the upper surfaces 216 are configured to form part of the reception end 122 of the scintillator crystal array 120, and the lower surfaces 218 are configured to form part of the emission end 124. Therefore, the upper surfaces 216 are photon reception surfaces and the lower surfaces 218 are photon emission surfaces. The lower surfaces 218 face the photosensors 130 (shown in FIG. 2). Each crystal 162 may extend a full length (or height) of the crystal array 120 between the reception and emission ends 122, 124. The crystals 162 are oriented relative to an object to be imaged such that an annihilation ray impinges upon the upper surface 216 of one of the crystals 162, producing light photons that propagate through that crystal 162 towards the lower surface 218. At least some of the light photons are emitted from the inner side wall 212 into the interstitial gap 210 and are received by the adjacent crystal 162. The interstitial gap 210 has a depth extending from the upper surfaces 216 to the lower surfaces 218 of the crystals 162, and light photons may be emitted from the inner side wall 212 at different locations along the depth of the gap 210. Due to light spreading, both crystals 162 may emit light photons from the respective lower surfaces 218 towards the photosensors 130, although the amount and/or energy of the light photons emitted from the crystal 162 that received the annihilation ray may be greater than the light photons emitted from the adjacent crystal 162. In an embodiment, both crystals 162 shown in FIG. 4 are associated with a common photosensor 130 such that light photons emitted from the lower surfaces 218 of the two crystals 162 are received by the same photosensor 130. Alternatively, the two adjacent crystals 162 may be aligned and associated with different photosensors 130.

In an embodiment, the scintillator crystal array 120 includes a clear film adhesive (CFA) layer 220 disposed within the interstitial gap 210 between the adjacent crystals 162 (e.g., the first crystal 162A and the second crystal 162B). The CFA layer 220 is configured to at least partially optically couple the first and second crystals 162A, 162B across the gap 210. For example, the CFA layer 220 provides a light transmission path across the gap 210 between the two crystals 162A, 162B. The light transmission path provided by the CFA layer 220 is more light transmissive than an air gap between the crystals 162A.

Referring now back to FIG. 3, the crystal array 120 includes multiple CFA layers 220 disposed in the interstitial gap 210B between the crystals 162 in the second and third columns 206. For example, one CFA layer 220 is disposed between each of the adjacent pairs of crystals 162 that face each other across the gap 210B. The interstitial gap 210B may have a width between 10 and 120 micrometers, such as between 50 and 80 micrometers, due at least in part to the presence of the CFA layers 220 in the gap 210B. In the illustrated embodiment, the CFA layers 220 are not disposed within every interstitial gap 210 between adjacent crystals 162. The location of the CFA layers 220 may be determined to achieve a designated amount of light spread along the crystal array 120. For example, the interstitial gap 210A between the first and second columns 206, the gap 210C between the third and fourth columns 206, and the gaps 210 defined between adjacent rows 208 do not include CFA layers 220 in the illustrated embodiment. It is recognized that the CFA layer 220 optionally may be installed between all adjacent crystals 162 or between a subset of adjacent crystal pairs 162. For example, some CFA layers 220 may be disposed in the gaps 210 between rows 208, and other CFA layers 220 may be disposed in the gaps 210 between columns 206 (like the CFA layers 220 shown in FIG. 3). Although four different CFA layers 220 are disposed along the length of the gap 210B in FIG. 3, alternatively a single extended CFA layer 220 may extend the entire length of the gap 210B between multiple pairs of adjacent crystals 162.

Although FIG. 3 shows all of the interstitial gaps 210 having approximately the same width, in an embodiment the gaps 210 that do not include CFA layers 220 therein may have narrower widths than the gaps 210 that have the CFA layers 220. For example, the adjacent crystals 162 that do not include CFA layers 220 may contact one another through a very small air gap that is less than 1 micrometer. In order to keep the size of the crystal array compact, the crystals that engage the CFA layers 220 may be formed to have smaller dimensions than the crystals that do not engage the CFA layers 220.

Figure 5:
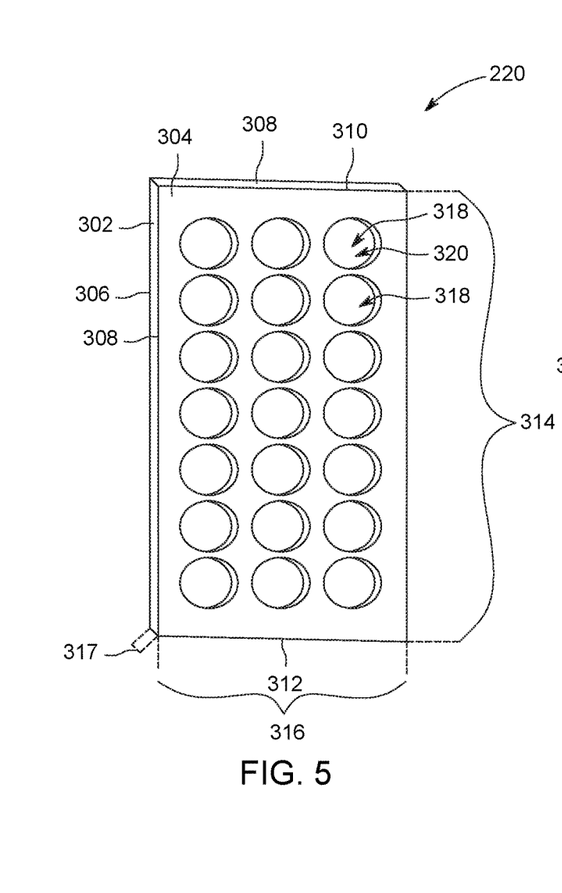
FIG. 5 is a perspective view of a CFA layer of the scintillator crystal array according to an embodiment

FIG. 5 is a perspective view of the CFA layer 220 shown in FIG. 4 according to an embodiment. The CFA layer 220 in the illustrated embodiment is a sheet that includes a first side 304 and an opposite second side 306. The first and second sides 304, 306 are relatively planar. The first and second sides 304, 306 extend a height 314 of the CFA layer 220 between a top 310 and a bottom 312 of the CFA layer 220. The CFA layer 220 includes edge sides 308 that extend between the first and second sides 304, 306. The edge sides 308 define a thickness 317 of the CFA layer 220. The thickness 317 of the CFA layer 220 may correspond to the width of the interstitial gap 210 to allow the CFA layer 220 to fit within the interstitial gap 210. For example, the thickness 317 of the CFA layer 220 may be less than 100 microns, such as between 50 and 80 microns. In an embodiment, the thickness of the CFA layer 220 is approximately 50 microns. In the illustrated embodiment, the CFA layer 220 has a lateral width 316 that corresponds to the length and/or width of the crystals 162 (shown in FIG. 4), such that the width 316 may be between 2 and 6 mm, such as 4 mm. Optionally, the CFA layer 220 may be sized such that the CFA layer 220 does not protrude laterally between the two crystals 162, as shown in FIG. 4.

The CFA layer 220 is at least partially composed of a CFA film 302. The CFA film 302 has a relatively high light transparency. For example, at least 80% of light energy (e.g., photons) that impinge upon the CFA film 302 may be transmitted through the CFA film 302 between the first and second sides 304, 306. The CFA film 302 may be composed of an acrylic adhesive material including acrylate and/or methyl acrylate polymers. The CFA film 302 has a refractive index between 1.3 and 1.8, such as between 1.45 and 1.5. In an embodiment, the CFA film 302 has a refractive index of approximately 1.47. In addition, the CFA film 302 may have a haze characteristic, representative of the degree of cloudiness of a material, of less than 1%, such as 0.1% in an embodiment. In an embodiment, the CFA film 302 may be 3M™ Optically Clear Adhesive 8142.

In one embodiment, the CFA layer 220 is composed entirely of the CFA film 302. The CFA layer 220 may be sized and/or shaped to achieve a desired amount of optical coupling between the adjacent crystals on either side of the CFA layer 220. For example, installing a CFA layer 220 that covers a larger surface area of the inner sides of the crystals would provide more optical coupling (e.g., a greater amount of light transmission) between the crystals than a CFA layer 220 that covers less surface area, since the CFA layer 220 provides better optical coupling than an air gap.

In one or more other embodiments, the CFA layer 220 includes the CFA film 302 and also at least one non-coupling (NC) region 318. The NC regions 318 are configured to provide local decoupling to at least partially optically separate the crystals 162 (shown in FIG. 5) on either side of the CFA layer 220. As described in more detail with reference to FIG. 6 below, the NC regions 318 are configured to offset the relatively high amount or degree of optical coupling between the two crystals 162 provided by the CFA film 302 in order for the CFA layer 220 to provide a net amount of optical coupling that is at a designated value or within a designated range. In the illustrated embodiment, the NC regions 318 are air pockets 320 extending through the thickness 317 of the CFA layer 220 between the first and second sides 304, 306. For example, the air pockets 320 may be formed by removing portions of the CFA film 302 via cutting, stamping, pressing, or the like. In the illustrated embodiment, the air pockets 320 have generally circular or elliptical shapes, and have approximately the same size. Furthermore, all air pockets 320 in the illustrated embodiment are located interior of the edge sides 308, such that portions of the CFA film 302 extend from the air pockets 320 to the edge sides 308. The air pockets 320 are distributed across the CFA layer 220 in a predetermined pattern. For example, the air pockets 320 are arranged in multiple rows of three air pockets 320 along the height 314 of the CFA layer 220. The CFA film 302 defines the edges of the air pockets 320 and extends between the air pockets 320.

In one or more alternative embodiments, the air pockets 320 may have non-circular shapes, such as oval, rectangular, or triangular shapes. The air pockets 320 also may have different shapes and/or sizes relative to one another, and/or may be arranged in a non-uniform pattern. Furthermore, in one or more alternative embodiments, the air pockets 320 may extend to the edge sides 308 of the CFA layer 220.

Figure 6:
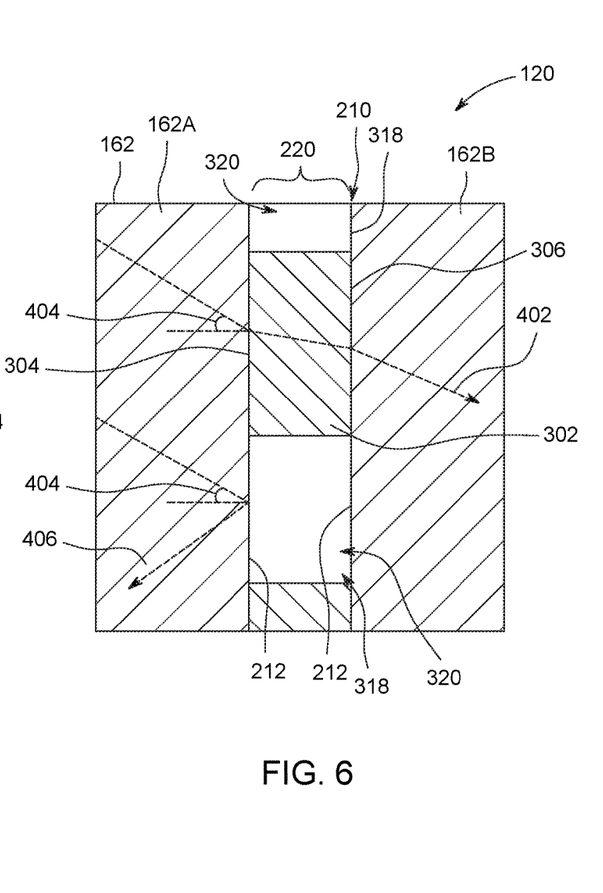
FIG. 6 is a close-up cross-sectional view of a portion of the scintillator crystal array shown in FIG. 4 including the CFA layer in an interstitial gap between two crystals.

FIG. 6 is a close-up cross-sectional view of a portion of the scintillator crystal array 120 shown in FIG. 4 including the CFA layer 220 in the interstitial gap 210 between two crystals 162. The CFA layer 220 may be the CFA layer 220 shown in FIG. 5, such that the NC regions 318 are air pockets 320. In an embodiment, the first side 304 of the CFA layer 220 engages the inner side wall 212 of the first crystal 162A, and the second side 306 engages the inner side wall 212 of the second crystal 162B.

In an embodiment, the CFA film 302 is configured to allow transmission of light photons emitted from the inner side wall 212 of the first crystal 162A through the CFA film 302 across the gap 210 into the second crystal 162B, while the NC regions 318 are configured to reduce or prohibit the transmission across the gap 210 of the light photons that impinge upon the NC regions 318. Therefore, the CFA film 302 optically couples the two crystals 162A, 162B, while the NC regions 318 provide local decoupling to at least partially optically separate the two crystals 162A, 162B.

For example, the crystals 162 have a first refractive index, and the CFA film 302 has a second refractive index that is within a designated range of the first refractive index. The designated range is sufficiently narrow such that light photons impinging upon the interfaces between the crystals 162 and the CFA film 302 at certain incident angles are transmitted across the interface between mediums (e.g., via refraction). For example, the designated range (e.g., refractive index difference) may be less than 0.7, such as 0.5. In an embodiment, the first refractive index of the crystals 162 may be approximately 1.82 (e.g., for LYSO crystals), and the second refractive index of the CFA film 302 may be approximately 1.47. Therefore, the difference between the refractive indices of the crystals 162 and the CFA film 302 is approximately 0.35, which is within the designated range of 0.5. In an embodiment, the NC regions 318 of the CFA layer 220 have a third refractive index that is outside of the designated range relative to the first refractive index of the crystals 162. For example, the air pockets 320 filled with air have a refractive index of approximately 1.0. The difference between the refractive indices of the NC regions 318 and the crystals 162 (at 1.82) is approximately 0.82, which is greater than the designated range of 0.5. The closer proximity of the refractive index of the CFA film 302 to the crystals 162 relative to the proximity of the refractive index of the NC regions 318 to the crystals 162 indicates that a greater proportion of light photons incident upon the interface between one of the crystals 162 and the CFA film 302 will be refracted across the interface than the proportion of light photons incident upon the interface between one of the crystals 162 and one of the NC regions 318.

For example, a first light photon 402 within the first crystal 162A that impinges upon the interface between the crystal 162A and the CFA film 302 at a first incident angle 404 is refracted across the interface into the CFA film 302 in the interstitial gap 210. The same light photon 402 then impinges upon the interface between the CFA film 302 and the second crystal 162B, and is refracted across the interface into the second crystal 162B, which illustrates how the CFA layer 220 provide optical coupling between the two crystals 162A, 162B. However, a second light photon 406 within the first crystal 162A that impinges upon the interface between the crystal 162A and the NC region 318 at the same first incident angle 404 is reflected back into the first crystal 162A instead of being transmitted across the gap 210. Although the incident angles 404 of the two light photons 402, 406 are the same, the greater difference in refractive indices between the crystal 162A and the air gap 320, relative to the refractive index difference between the crystal 162A and the CFA film 302, prohibits the second light photon 406 from being transmitted through the CFA layer 220 across the gap 210. Therefore, the NC regions 318 provide local decoupling between the two crystals 162A, 162B. It is recognized that at least some light photons may be transmitted across the gap 210 through the air pocket 320, such as light photons with a low angle of incidence relative to the interface, but a greater percentage of light photons (e.g., at a greater range of incident angles) will be transmitted across the gap 210 through the CFA film 302 than the light photons transmitted across the gap 210 through the air pockets 320.

In one or more embodiments, the compositions of the CFA film 302 and the NC regions 318 (e.g., which controls the refractive indices) and the respective areas of the CFA film 302 and NC regions 318 relative to the total area of the CFA layer 220 may be selected to achieve a select amount of optical coupling between the two crystals 162A, 162B via the CFA layer 220. For example, a selected amount of local decoupling to offset the optical coupling provided by the CFA film 302 is achieve by controlling the material of the NC regions 318 (e.g., air or a reflective insert) and the total area occupied by the NC regions 318.

Figure 7:
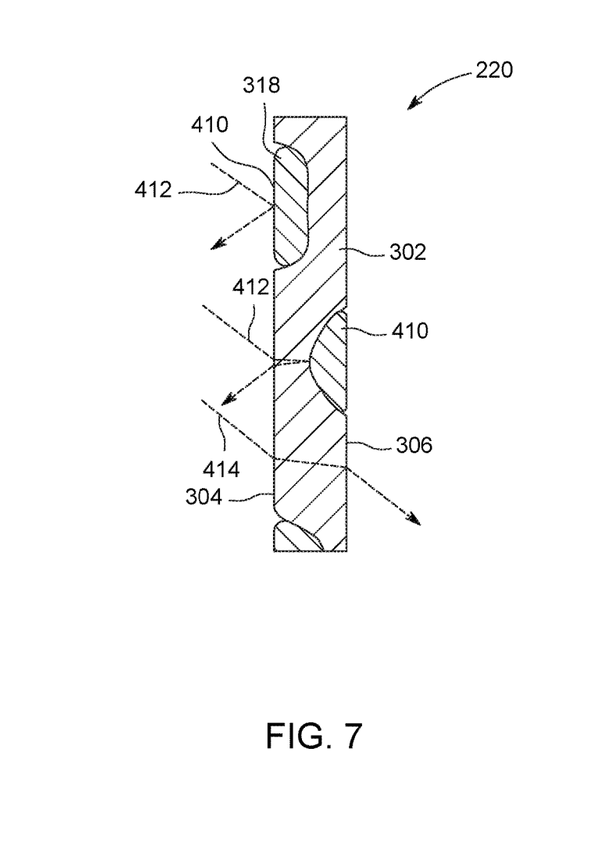
FIG. 7 is a cross-sectional view of a portion of the CFA layer according to an alternative embodiment.

FIG. 7 is a cross-sectional view of a portion of the CFA layer 220 according to an alternative embodiment. In the illustrated embodiment, the NC regions 318 in the CFA layer 220 are defined by light reflective inserts 410 instead of the air pockets 320 shown in FIGS. 5 and 6. However, the CFA layer 220 may include both at least one air pocket and at least one reflective insert in another alternative embodiment. The reflective inserts 410 are configured to reflect incident light photons, instead of transmitting incident light photons through the inserts 410. As shown in FIG. 7, the two light photons 412 that impinge upon reflective inserts 410 are reflected by the reflective inserts 410, and are not emitted from the second side 306 of the CFA layer 220. However, the light photon 414 that does not impact a reflective insert 410 is transmitted from the first side 304 through the CFA film 302 and is emitted from the second side 306. The reflective inserts 410 may be flakes, particles, film or the like. The inserts 410 may be composed of a metal material, a carbon material, and/or a plastic material configured to reflect light. The inserts 410 may be embedded within the CFA film 302, applied in a coating over the CFA film 302, or the like. For example, the reflective inserts 410 may be embedded in the CFA film 302 such that most, if not all, of the mass of reflective inserts is disposed between the portions of the first and second sides 304, 306 of the CFA layer 220 defined by the CFA film 302. The reflective inserts 410 shown in FIG. 7 are different than reflective layers that extend along one or both sides 304, 306 of the CFA layer 220 because the reflective inserts 410 are embedded in the CFA film 302 and/or the reflective inserts 410 have smaller sizes than reflective layers. For example, the reflective inserts 410 may be particles, not sheets of reflective material. In an embodiment, the reflective inserts 410 may have specular reflectivity or Lambertian reflectivity depending on the application.

Figure 8:
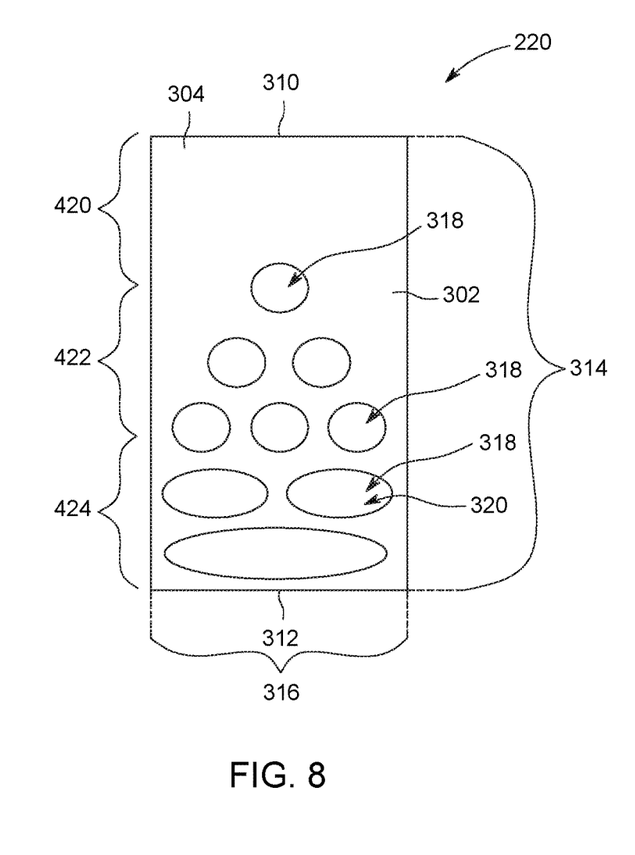
FIG. 8 shows a side of the CFA layer according to another alternative embodiment.

FIG. 8 shows the first side 304 of the CFA layer 220 according to another alternative embodiment. The CFA layer 220 in the illustrated embodiment includes multiple NC regions 318 that define air pockets 320, but the air pockets 320 are not arranged in a uniform pattern as shown in FIG. 5. Rather, the proportion of the width 316 of the CFA layer 220 occupied by the air pockets 320 (relative to the CFA film 302) varies along the height 314 of the CFA layer 220. Furthermore, the sizes of the air pockets 320 vary in the illustrated embodiment.

For example, a top region 420 of the CFA layer 220 extending from the top 310 includes a first proportion or percentage of the area occupied by NC regions 318 (e.g., air pockets), a middle region 422 includes a second proportion or percentage of the area occupied by NC regions 318, and a lower region 424 extending to the bottom 312 includes a third proportion or percentage of the area occupied by NC regions 318. The third proportion is greater than the second proportion, which is greater than the first proportion. Therefore, the top region 420 provides a greater amount of optical coupling between the crystals 162 (shown in FIG. 6) than the middle and lower regions 422, 424. For example, the scintillator crystal array 120 shown in FIG. 2 may be configured to promote light spreading between adjacent crystals 162 along regions proximate to the upper surfaces 216 (shown in FIG. 4) and to prohibit light spreading along regions proximate to the lower surfaces 218 (FIG. 4) and the photosensors 130 (FIG. 2). Therefore, less light is transmitted across the interstitial gap 210 (FIG. 4) with increasing depth along the gap 210 relative to the upper surfaces 216. The one or more NC regions 318 may be distributed across the CFA layer 220 according to other light spreading schemes in other embodiments.

Figure 9:
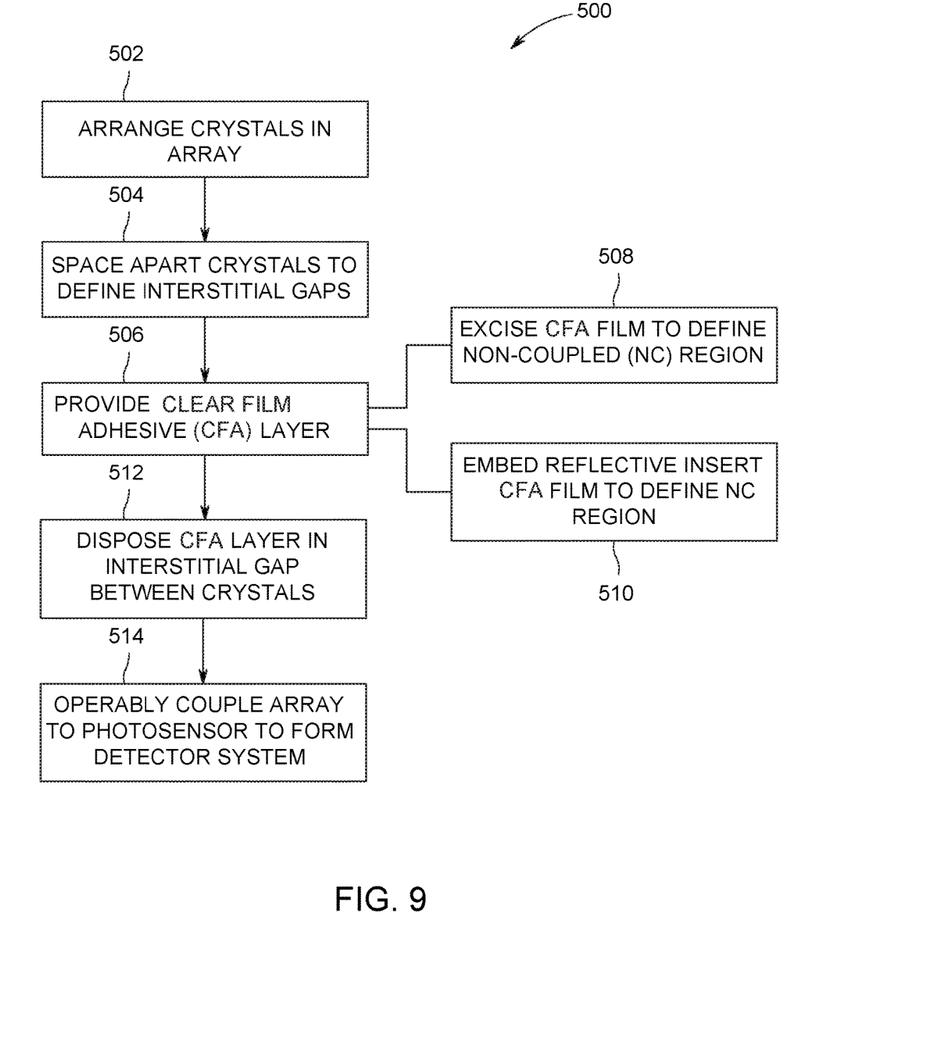
FIG. 9 is a flowchart of a method for forming a scintillator crystal array in accordance with various embodiments for use in a detector system to image an object.

FIG. 9 is a flowchart of a method 500 for forming a detector system in accordance with various embodiments for imaging an object. The detector system, for example, may be configured for use with a PET imaging system. In other embodiments, the detector system may be configured for one or more other modalities of imaging additionally or alternatively. The method 500 may employ, include, or relate to structures or aspects of various embodiments discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion.

At 502, crystals are arranged in an array (e.g., a scintillator crystal array). The array extends between a reception end and an emission end. The crystals are configured to receive rays (e.g., annihilation rays) emitted by an object to be imaged at the reception end. Responsive to receiving a ray, a corresponding crystal in the array is configured to scintillate, emitting light photons in various directions. At least some of the light photons are transmitted through the crystal. The crystals may be composed of LYSO or BGO in various embodiments. The array includes multiple crystals, such as between four and 100 crystals, and may be arranged in multiple columns and rows extending perpendicular to the columns.

At 504, a first crystal in the array is positioned relative to a second crystal in the array to space apart the first and second crystals by an interstitial gap. The first and second crystals include respective inner side walls that extend along the gap and face one another. The interstitial gap may have a width between the first and second crystals of less than 100 microns, such as 50 microns. In an embodiment, each crystal in the array is spaced apart from adjacent crystals (e.g., in the same row or column) by interstitial gaps. The gaps may extend between the columns and between the rows of crystals in the array. The interstitial gaps extend between the reception and emission ends of the array.

At 506, a clear film adhesive (CFA) layer is provided. The CFA layer is configured to at least partially optically couple adjacent crystals located on either side of the CFA layer. The CFA layer includes a light transmissive CFA film and at least one non-coupling (NC) region configured to reflect light instead of transmitting light fully through the CFA layer. Optionally, the CFA layer may include multiple NC regions that are distributed across the CFA layer in a predetermined pattern. By way of example, the CFA layer may be formed as discussed in connection with steps 508 and/or 510. At 508, the at least one NC region is at least one air pocket extending through the CFA layer between first and second sides of the CFA layer. The one or more air pockets may be formed by excising a portion of the CFA film extending through a thickness of the CFA film. The CFA film may be excised or removed by mechanically cutting, stamping, laser cutting, or the like. For example, the CFA film may be provided between two liners, and the excision process may remove portions of the liners as well as the CFA film. At 510, the at least one NC region includes at least one reflective insert that is configured to reflect incident light photons to block the light photons from being transmitted fully through the CFA layer. The reflective inserts may be particles, such as flakes, fibers, film, tape, or the like. The reflective inserts may be installed into the CFA layer by embedding the particles into the CFA film (e.g., before or after removing the liners from the CFA film).

At 512, the CFA layer is disposed in the interstitial gap between adjacent crystals in the array. The CFA layer in the gaps at least partially optically couples the adjacent crystals in the array. For example, the CFA layer is placed into the gap between the first and second crystals. The CFA layer may be disposed in the gap by peeling a liner along a first side of the CFA layer and attaching the CFA film to an inner side wall of the first crystal. Then, a liner along a second side of the CFA layer is peeled from the CFA layer, and the first crystal, with the CFA layer attached thereto, is arranged adjacent to the second crystal. Alternatively, the CFA layer may be loaded into the interstitial gap after the first and second crystals are fixed in place. In an embodiment, the second side of the CFA layer engages the inner side wall of the second crystal, such that the CFA layer extends a full width of the gap and engages both crystals. The CFA film is light transmissive and is configured to optically couple the first and second crystals such that photons can be transmitted between the first and second crystals across the interstitial gap. The NC regions, on the other hand, are configured to provide local decoupling to at least partially optically separate the first and second crystals. The NC regions at least partially offset the amount or optical coupling provided by the CFA film. Therefore, the CFA layer may be designed by selecting the number, locations, sizes, and compositions of the NC regions in order for the CFA layer to achieve a net amount of optical coupling between adjacent crystals that is equal to, or within a designated range of, a desired optical coupling value.

At 514, the array may be operably coupled to at least one photosensor to form a detector system used to image an object. For example, emission end of the array is oriented to face the at least one photosensor, such that light photons emitted from the emission end are received by the at least one photosensor. Optionally, the at least one photosensor includes multiple photosensors arranged together in a photosensor array. The pixels of the photosensors may align with the crystals of the array. Optionally, a light guide may be interposed between the crystal array and the at least one photosensor.

Figure 10:
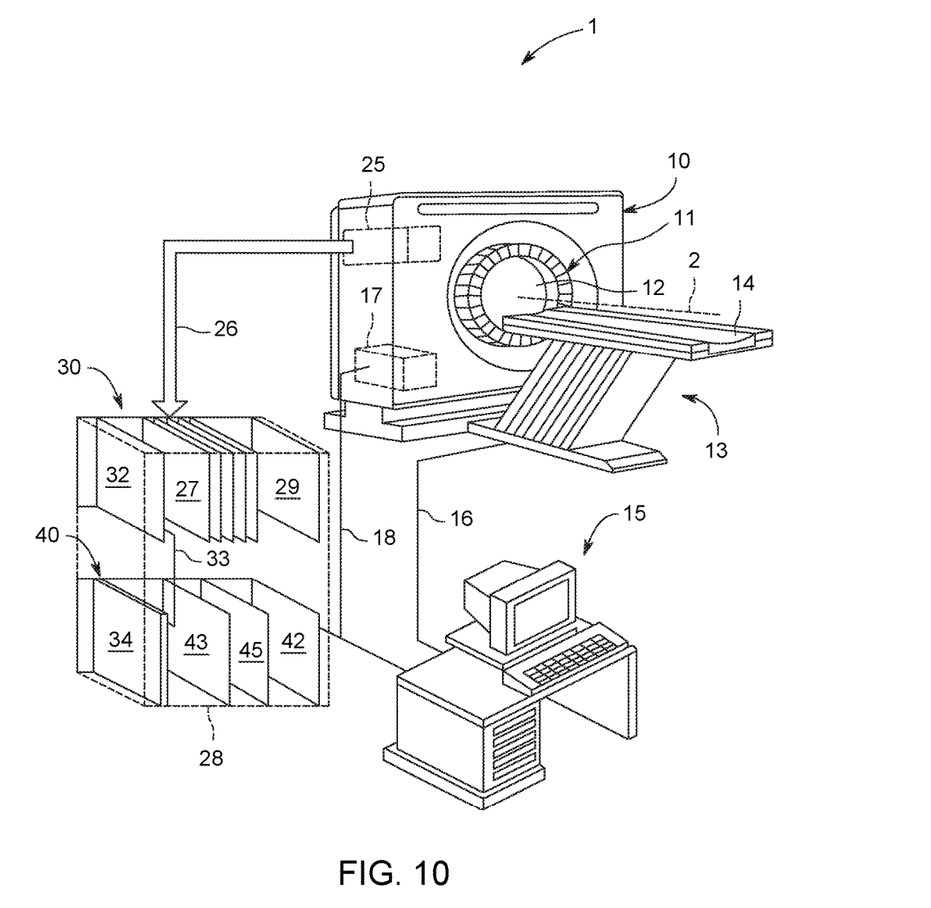
FIG. 10 illustrates a PET imaging system with which various embodiments described herein may be employed.
Figure 11:
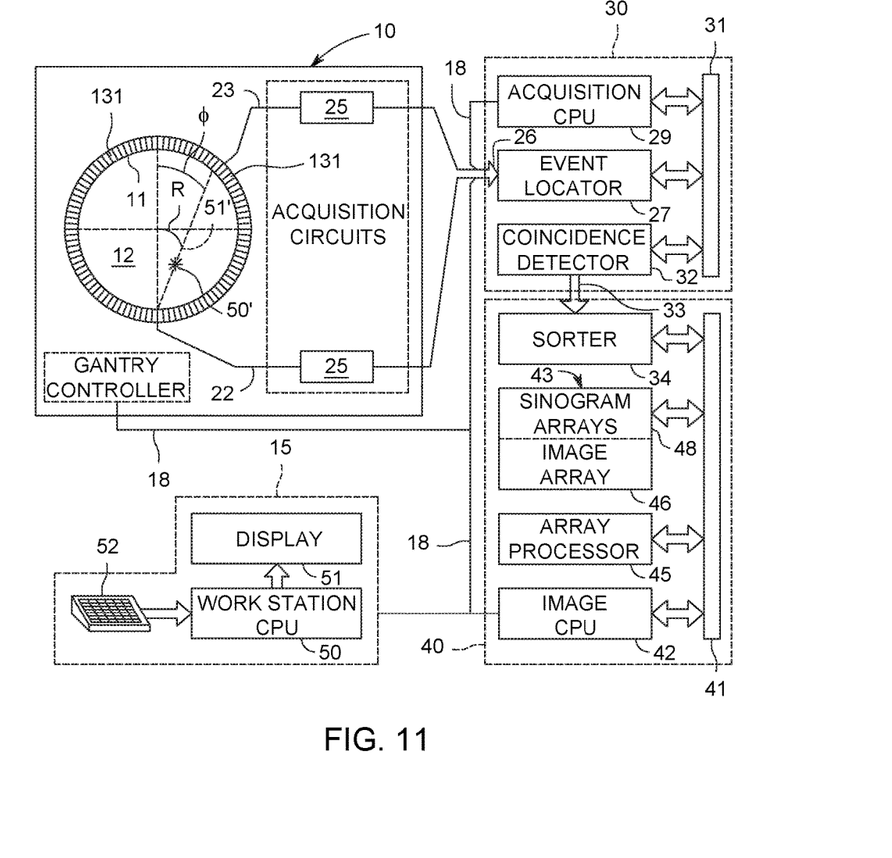
FIG. 11 is a schematic diagram of the PET imaging system of FIG. 10.

FIG. 10 illustrates a PET imaging system 1 with which various embodiments described herein may be employed. FIG. 11 is a schematic diagram of the PET imaging system according to an embodiment. In other embodiments, the scintillator crystal arrays as discussed herein may be utilized with other imaging systems (e.g., imaging systems configured for one or more additional or alternative modalities). The PET scanning system 1 shown in FIG. 10 includes a gantry 10 that supports a detector ring assembly 11 about a central opening or bore 12. The detector ring assembly 11 in the illustrated embodiments is generally circular and is made up of plural rings of detector 110 spaced along a central axis 2 to from a cylindrical detector ring assembly. In various embodiments, the detector ring assembly 11 may include 4 rings of detectors spaced along the central axis 2. A patient table 13 is positioned in front of the gantry 10 and is aligned with the central axis 2 of the detector ring assembly 11. A patient table controller (not shown) moves the table bed 14 into the bore 12 in response to commands received from an operator work station 15 through a communications link 16. A gantry controller 17 is mounted within the gantry 10 and is responsive to commands received from the operator work station 15 through a second communication link 18 to operate the gantry.

As shown in FIG. 11, the operator work station 15 includes a central processing unit (CPU) 50, a display 51, and a user interface device 52. An operator may use the user interface device 52 to control the calibration of the PET scanner, the configuration of the PET scanner, and the positioning of the patient table for a scan. Also, the operator may control the display of the resulting image on the display 51 and/or perform image enhancement functions using programs executed by the work station CPU 50.

The detector ring assembly 11 includes a number of detector modules. For example, the detector ring assembly 11 may include 36 detector modules, with each detector module including eight photosensor arrays. An example of one photosensor array 131 is shown in FIG. 2. The photosensor arrays in a detector module may be arranged, for example, in a 2×4 configuration such that the circumference of the detector ring assembly 11 is seventy-two blocks around, and the width of the detector assembly 11 is four photosensor arrays wide. Each photosensor array is associated with a scintillator crystal array 120 (shown in FIG. 2) including multiple crystals 162 (FIG. 2) and a CFA layer 220 (FIG. 4) within the interstitial gap 210 (FIG. 4) between at least some adjacent crystals 162.

As shown in FIG. 11, a set of acquisition circuits 25 is mounted within the gantry 10 to receive the four signals from the photosensor arrays. The acquisition circuits 25 determine the event coordinates within the array of detector crystals using the relative signal strengths. The results are digitized and sent through a cable 26 to an event locator circuit 27 housed in a separate cabinet 28. Each acquisition circuit 25 also produces an event detection pulse which indicates the exact moment the scintillation event took place.

The event locator circuits 27 form part of a data acquisition processor 30 which periodically samples the signals produced by the acquisition circuits 25. The data acquisition processor 30 has an acquisition CPT 29 which controls communications on the local area network 18 and a bus 31. The event locator circuits 27 assemble the information regarding each valid event into a set of digital numbers that indicated when the event took place and the identity of the detector crystal 162 (FIG. 2) which detected the event. The event locator circuits 27, for example, may use a detector position map to map a pair of coordinates to the crystal 162 which detected the event.

The event data packets are transmitted to a coincidence detector 32 which is also part of the data acquisition processor 30. The coincidence detector 32 accepts the event data packets from the event locator circuits 27 and determines if any two of them are in coincidence. Coincidence is determined by a number of factors. For example, time markers in each event data packet may be required to be within a specified time period of each other, e.g., six nanoseconds. As another example, the locations indicated by the two event data packets may be required to lie on a straight line which passes through the field of view (FOV) of in the scanner bore 12. Events which cannot be paired are discarded, but coincident event pairs are located and recorded as a coincidence data packet that is transmitted through a serial link 33 to a sorter 34. The format of the coincidence data packet may be, for example, a thirty-two bit data stream which includes, among other things, a pair of digital number that precisely identify the locations of the two detector crystals 162 that detected the event.

The sorter 34, which may include a CPU and which forms part of an image reconstruction processor 40, receives the coincidence data packets from the coincidence detector 32. The function of the sorter 34 is to receive the coincidence data packets and allocate sinogram memory for the storage of the coincidence data. The set of all projection rays that point in the same direction ($\theta$) and pass through the scanner's field of view is a complete projection, or "view", which makes a set of sinogram. The distance (R) between a particular projection ray and the center of the field of view locates that projection ray within the view. As shown in FIG. 11, for example, an event 50' occurs along a projection ray 51' which is located in a view at the projection angle $\theta$ and the distance R. The sorter 34 counts all of the events that occur on this projection ray (R, $\theta$) during the scan by sorting out the coincidence data packets that indicate an event at the detector crystals 162 (FIG. 2) lying on the projection ray. During an emission scan, the coincidence counts are organized in memory 43, for example as a set of two-dimensional array, one for each axial image, and each having as one of its dimensions the projection angle $\theta$ and the other dimension the distance R. This $\theta$ by R map of the measured events may be referred to as sinogram array 48. The sorter 34 may also organize the coincidence events into other data formats. In a projection plane format, for example, other variables may be used to define coincidence events which are detected by pairs of detector crystals 162 in non-adjacent detector rings.

Coincidence events occur at random and the sorter 34 determines the $\theta$ and R values from the two crystal addresses in each coincidence data packet and increments the count of the corresponding sonogram array element. At the completion of the emission scan, the sinogram array 48 stores the total number of annihilation events which occurred along each ray. The array processor 45 reconstructs an image from the data in the sinogram array 48. First, however, a number of corrections may be made to the acquired data to correct for measurement errors such as those caused by attenuation of annihilation rays by the patient, detector gain non-uniformities, random coincidences, and integrator dead time. Each row of the corrected sinogram array is then Fourier transformed by the array processor 45 and multiplied by a one-dimensional filter array. The filtered data is then invers Fourier transformed, and each array element is back projected to form the image array 46. The image CPU 42 may either store the image array data or output the data to the operator work station 15.

It should be noted that the various embodiments may be implemented in hardware, software or a combination thereof. For example, the controllers and processing units may be implemented as part of one or more computers and/or processors. The one or more computers and/or processors may include a computing device, an input device, a display unit and an interface, for example, for accessing the Internet. The one or more computers and/or processors may include a microprocessor. The microprocessor may be connected to a communication bus. The one or more computers and/or processors may also include a memory. The memory may include Random Access Memory (RAM) and Read Only Memory (ROM). The one or more computers and/or processors further may include a storage device, which may be a hard disk drive or a removable storage drive such as a solid state drive, optical drive, and the like. The storage device may also be other similar means for loading computer programs or other instructions into the one or more computers and/or processors.

As used herein, the term "computer" may include any processor-based or microprocessor-based system including systems using microcontrollers, reduced instruction set computers (RISC), application specific integrated circuits (ASICs), logic circuits, GPUs, FPGAs, and any other circuitry capable of executing the functions described herein. The above examples are exemplary only, and are thus not intended to limit in any way the definition and/or meaning of the term "computer."

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments described and/or illustrated herein. The set of instructions may be in the form of a software program. The software may be in various forms such as system software or application software and which may be embodied as a tangible and non-transitory computer readable medium. Further, the software may be in the form of a collection of separate programs, a sub-program within a larger program, or a portion of a program. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program. The individual components of the various embodiments may be virtualized and hosted by a cloud type computational environment, for example to allow for dynamic allocation of computational power, without requiring the user concerning the location, configuration, and/or specific hardware of the computer system It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f) unless and until such claim limitations expressly use the phrase "means for" followed by a statement of function void of further structure.

This written description uses examples to disclose the various embodiments of the invention, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A scintillator crystal array, comprising:
   crystals configured to receive rays emitted by an object to be imaged and to emit light photons responsive to the rays, the crystals including at least a first crystal and a second crystal that are spaced apart from one another by a gap, the first and second crystals including respective inner side walls that extend along the gap and face one another; and
   a clear film adhesive (CFA) layer disposed in the gap between the first and second crystals, the CFA layer comprising a CFA film configured to at least partially optically couple the first and second crystals, the CFA layer further comprising at least one non-coupling (NC) region within the CFA film, the at least one NC region configured to provide local decoupling to at least partially optically separate the first and second crystals.

2. The scintillator crystal array of claim 1, wherein the CFA layer includes a first side and an opposite second side, the first side engaging the inner side wall of the first crystal, the second side engaging the inner side wall of the second crystal.

3. The scintillator crystal array of claim 1, wherein the gap is a first gap and the inner side wall of the first crystal that extends along the first gap is a first inner side wall of the first crystal facing the second crystal, the crystals further include a third crystal spaced apart from the first crystal by a second gap, the first crystal including a second inner side wall extending along the second gap and facing the third crystal, the CFA layer disposed in the second gap between the first and third crystals.

4. The scintillator crystal array of claim 1, wherein the inner side walls of the first and second crystals extend between respective upper surfaces and respective lower surfaces of the first and second crystals, the lower surfaces of the first and second crystals configured to face and optically couple to a common photosensor.

5. The scintillator crystal array of claim 1, wherein the at least one NC region provides local decoupling between the first and second crystals by reducing transmission of at least some of the light photons emitted from the inner side wall of one of the first and second crystals from entering the other of the first and second crystals across the gap.

6. The scintillator crystal array of claim 1, wherein the at least one NC region of the CFA layer includes multiple NC regions distributed across the CFA layer in a predetermined pattern.

7. The scintillator crystal array of claim 1, wherein each NC region of the CFA layer includes at least one of an air pocket or a reflective insert.

8. The scintillator crystal array of claim 1, wherein the inner side walls of the first and second crystals extend between respective upper surfaces and respective lower surfaces of the first and second crystals, the gap having a depth extending from the upper surfaces to the lower surfaces, wherein a proportion of a width of the CFA layer occupied by the at least one NC region varies along the depth of the gap.

9. The scintillator crystal array of claim 1, wherein the first and second crystals have a first refractive index, and the CFA film of the CFA layer has a second refractive index within a designated range of the first refractive index to achieve a select amount of optical coupling between the first and second crystals through the CFA layer.

10. The scintillator crystal array of claim 9, wherein the at least one NC region has a third refractive index that is outside of the designated range of the first refractive index to achieve a select amount of the local decoupling.

11. A detector system comprising:
   a scintillator crystal array extending between a reception end and an emission end, the scintillator crystal array including crystals extending between the reception end and the emission end, the crystals configured to receive rays emitted by an object to be imaged at the reception end and to emit light photons responsive to the rays, the crystals including at least a first crystal and a second crystal that are spaced apart from one another by a gap, the first and second crystals including respective inner side walls that extend along the gap and face one another, the scintillator crystal array further including a clear film adhesive (CFA) layer disposed in the gap between the first and second crystals, the CFA layer configured to at least partially optically couple the first and second crystals, the CFA layer comprising at least one non-coupling (NC) region, the at least one NC region configured to provide local decoupling to at least partially optically separate the first and second crystals; and a photosensor configured to receive at least some of the light photons emitted from the emission end of the scintillator crystal array, the first and second crystals having respective lower surfaces at the emission end that face and optically couple to the photosensor.

12. The detector system of claim 11, wherein the photosensor is one of multiple photosensors of the detector system, the photosensors aligning and optically coupling with different subsets of the crystals in the scintillator crystal array.

13. The detector system of claim 12, wherein each subset in the scintillator crystal array includes at least four crystals.

14. The detector system of claim 11, wherein the CFA layer includes a first side and an opposite second side, the first side engaging the inner side wall of the first crystal, the second side engaging the inner side wall of the second crystal.

15. The detector system of claim 11, wherein the first and second crystals have a first refractive index, the CFA layer including a CFA film that has a second refractive index within a designated range of the first refractive index to achieve a select amount of optical coupling between the CFA layer and the first and second crystals, the at least one NC region having a third refractive index that is outside of the designated range of the first refractive index.

16. The detector system of claim 11, wherein the CFA layer includes a first side and an opposite second side, the at least one NC region being at least one air pocket defined through the CFA layer between the first and second sides.

17. A method for forming a detector system for imaging an object, the method comprising:
arranging crystals in an array, the crystals configured to receive rays emitted by an object to be imaged and to emit light photons responsive to the rays, the crystals including at least a first crystal and a second crystal;
positioning the first crystal relative to the second crystal to space apart the first and second crystals from one another by a gap, the first and second crystals including respective inner side walls that extend along the gap and face one another; and
disposing a clear film adhesive (CFA) layer in the gap between the first and second crystals, the CFA layer comprising a CFA film configured to at least partially optically couple the first and second crystals, the CFA layer further comprising at least one NC region within the CFA film, the at least one NC region configured to provide local decoupling to at least partially optically separate the first and second crystals.

18. The method of claim 17, wherein the CFA layer includes a first side and an opposite second side, the CFA layer located in the gap such that the first side engages the inner side wall of the first crystal and the second side engages the inner side wall of the second crystal.

19. The method of claim 17, wherein the at least one NC region is at least one air pocket defined through the CFA layer between a first side of the CFA layer and an opposite second side of the CFA layer, the method further comprising excising at least one portion of the CFA film between the first and second sides to define the at least one air pocket.

20. The method of claim 17, wherein the at least one NC region includes at least one reflective insert, the method further comprising embedding the at least one reflective insert in the CFA film to define the at least one NC region.

* * * * *